(12) United States Patent
Slama et al.

(10) Patent No.: US 9,962,851 B2
(45) Date of Patent: May 8, 2018

(54) METHOD OF MAKING POLYMERIC MULTILAYER FILMS

(71) Applicant: 3M INNOVATIVE PROPERTIES COMPANY, St. Paul, MN (US)

(72) Inventors: David F. Slama, City of Grant, MN (US); Garth V. Antila, Hudson, WI (US); Brent R. Hansen, New Richmond, WI (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 173 days.

(21) Appl. No.: 15/038,902

(22) PCT Filed: Nov. 25, 2014

(86) PCT No.: PCT/US2014/067294
§ 371 (c)(1),
(2) Date: May 24, 2016

(87) PCT Pub. No.: WO2015/088773
PCT Pub. Date: Jun. 18, 2015

(65) Prior Publication Data
US 2017/0165862 A1    Jun. 15, 2017

Related U.S. Application Data

(60) Provisional application No. 61/915,196, filed on Dec. 12, 2013.

(51) Int. Cl.
*B26F 1/26* (2006.01)
*B29C 47/88* (2006.01)
(Continued)

(52) U.S. Cl.
CPC ............... *B26F 1/26* (2013.01); *B26F 1/20* (2013.01); *B26F 1/22* (2013.01); *B26F 1/384* (2013.01);
(Continued)

(58) Field of Classification Search
CPC . B29C 47/004; B29C 47/8845; B29C 47/886; B29C 47/8805; B29C 47/0021;
(Continued)

(56) References Cited

U.S. PATENT DOCUMENTS 4,741,941 A    5/1988    Englebert
4,981,544 A    1/1991    Nordale
(Continued)

FOREIGN PATENT DOCUMENTS

CN    1316325    10/2001
EP    1004412    5/2000
(Continued)

OTHER PUBLICATIONS

International Search Report for PCT International Application No. PCT/US2014/067294, dated Mar. 5, 2015, 4 pages.

*Primary Examiner* — Nahida Sultana
(74) *Attorney, Agent, or Firm* — Gregory D. Allen

(57) ABSTRACT

Method of making a polymeric multilayer films (115) having an array of openings by coextrusion. Embodiments of polymeric multilayer films made as described herein are useful, for example, filtration and acoustic absorption.

12 Claims, 2 Drawing Sheets

(51) Int. Cl.
| | |
|---|---|
| *B29C 47/06* | (2006.01) |
| *B26F 3/06* | (2006.01) |
| *B29C 47/00* | (2006.01) |
| *B29C 47/32* | (2006.01) |
| *B26F 1/38* | (2006.01) |
| *B26F 1/20* | (2006.01) |
| *B26F 1/22* | (2006.01) |
| *B26F 3/10* | (2006.01) |
| B32B 37/15 | (2006.01) |
| B32B 38/00 | (2006.01) |
| B32B 38/06 | (2006.01) |
| B32B 38/04 | (2006.01) |
| B29L 7/00 | (2006.01) |
| B29L 9/00 | (2006.01) |

(52) U.S. Cl.
CPC ................ *B26F 3/06* (2013.01); *B26F 3/10* (2013.01); *B29C 47/003* (2013.01); *B29C 47/004* (2013.01); *B29C 47/0021* (2013.01); *B29C 47/065* (2013.01); *B29C 47/32* (2013.01); *B29C 47/8805* (2013.01); *B29C 47/886* (2013.01); *B29C 47/8845* (2013.01); *B29L 2007/008* (2013.01); *B29L 2009/00* (2013.01); *B32B 37/153* (2013.01); *B32B 38/0036* (2013.01); *B32B 38/06* (2013.01); *B32B 2038/047* (2013.01)

(58) Field of Classification Search
CPC .. B29L 2009/00; B29L 2007/008; B26F 3/10; B32B 38/0036
See application file for complete search history.

(56) References Cited

U.S. PATENT DOCUMENTS

| | | | | |
|---|---|---|---|---|
| 5,411,788 | A | * | 5/1995 | Hyde ...................... B29C 59/04 428/174 |
| 5,635,275 | A | | 6/1997 | Biagioli |
| 5,681,301 | A | | 10/1997 | Yang |
| 5,735,984 | A | | 4/1998 | Hoff |
| 5,789,065 | A | * | 8/1998 | Haffner .................... B32B 5/02 428/152 |
| 5,885,677 | A | | 3/1999 | Gosselin |
| 6,039,906 | A | | 3/2000 | Sageser |
| 6,106,922 | A | | 8/2000 | Cejka |
| 6,106,925 | A | | 8/2000 | Palumbo |
| 6,228,462 | B1 | | 5/2001 | Lee |
| 6,254,711 | B1 | | 7/2001 | Bull |
| 6,300,415 | B1 | | 10/2001 | Okayama |
| 6,345,688 | B1 | | 2/2002 | Veen |
| 6,443,257 | B1 | | 9/2002 | Wiker |
| 6,452,063 | B1 | | 9/2002 | Curro |
| 6,489,003 | B1 | | 12/2002 | Levitt |
| 6,684,744 | B2 | | 2/2004 | Suzuki |
| 6,715,387 | B2 | | 4/2004 | Suzuki |
| 6,769,512 | B2 | | 8/2004 | Bargo |
| 6,898,901 | B2 | | 5/2005 | Petroski |
| 7,037,100 | B2 | | 5/2006 | Strobel |
| 7,375,694 | B2 | | 5/2008 | Jung |
| 7,635,264 | B2 | | 12/2009 | Strobel |
| 8,273,943 | B2 | | 9/2012 | Noda |
| 8,367,184 | B2 | | 2/2013 | Slama |
| 8,381,872 | B2 | | 2/2013 | Alexander |
| 8,393,438 | B2 | | 3/2013 | Ogawa |
| 8,715,816 | B2 | | 5/2014 | Schmidt |
| 2001/0006714 | A1 | | 7/2001 | Bull |
| 2002/0001707 | A1 | | 1/2002 | Zhang |
| 2003/0037858 | A1 | * | 2/2003 | Kannankeril ....... B29C 66/0242 156/147 |
| 2004/0070100 | A1 | | 4/2004 | Strobel |
| 2005/0127541 | A1 | | 6/2005 | Spurgeon |
| 2005/0181164 | A1 | | 8/2005 | Piumarta |
| 2005/0245162 | A1 | * | 11/2005 | McCormack ....... B29C 47/0026 442/381 |
| 2006/0090839 | A1 | * | 5/2006 | O'Dowd ................ B29C 65/18 156/196 |
| 2006/0108052 | A1 | * | 5/2006 | Kannankeril ....... B29C 47/0021 156/123 |
| 2006/0225831 | A1 | * | 10/2006 | Lei ...................... B29C 47/0047 156/229 |
| 2009/0288764 | A1 | | 11/2009 | Arrington |
| 2010/0219540 | A1 | | 9/2010 | Hebrink |
| 2010/0221491 | A1 | | 9/2010 | Hebrink |
| 2010/0291344 | A1 | | 11/2010 | Arroyo-Villan |
| 2011/0210472 | A1 | | 9/2011 | Feisel |
| 2011/0247681 | A1 | * | 10/2011 | Wu ...................... B29C 47/0021 136/251 |
| 2012/0244314 | A1 | | 9/2012 | Scheibner |
| 2013/0071589 | A1 | | 3/2013 | Hannington |
| 2014/0024513 | A1 | | 1/2014 | Robert |

FOREIGN PATENT DOCUMENTS

| | | |
|---|---|---|
| EP | 1815968 | 8/2007 |
| EP | 2517961 | 10/2012 |
| GB | 2298817 | 9/1996 |
| WO | WO 01/41905 | 6/2001 |
| WO | WO 02/074522 | 9/2002 |
| WO | WO 2011/081894 | 7/2011 |
| WO | WO 2015/089024 | 6/2014 |
| WO | WO 2014/158801 | 10/2014 |
| WO | WO 2014/158807 | 10/2014 |
| WO | WO 2014/164063 | 10/2014 |

* cited by examiner

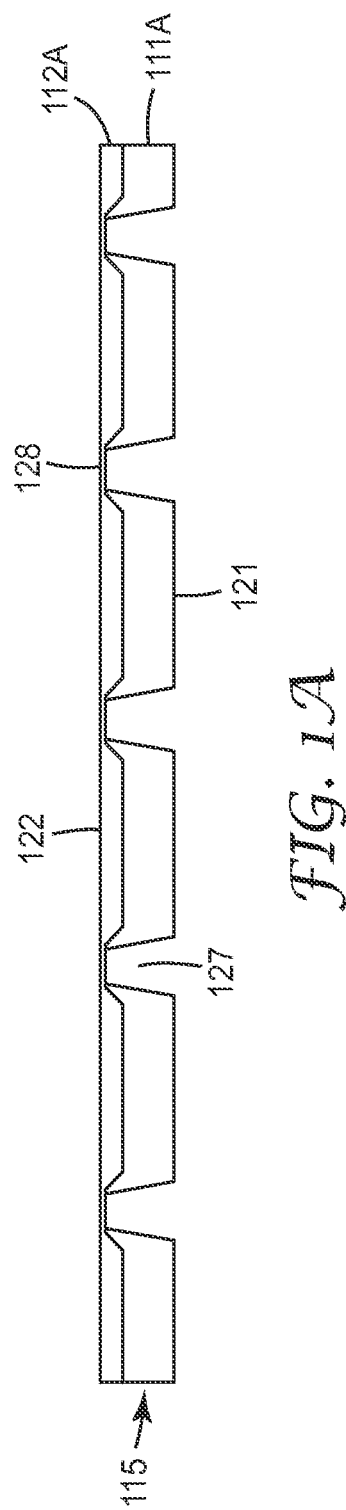
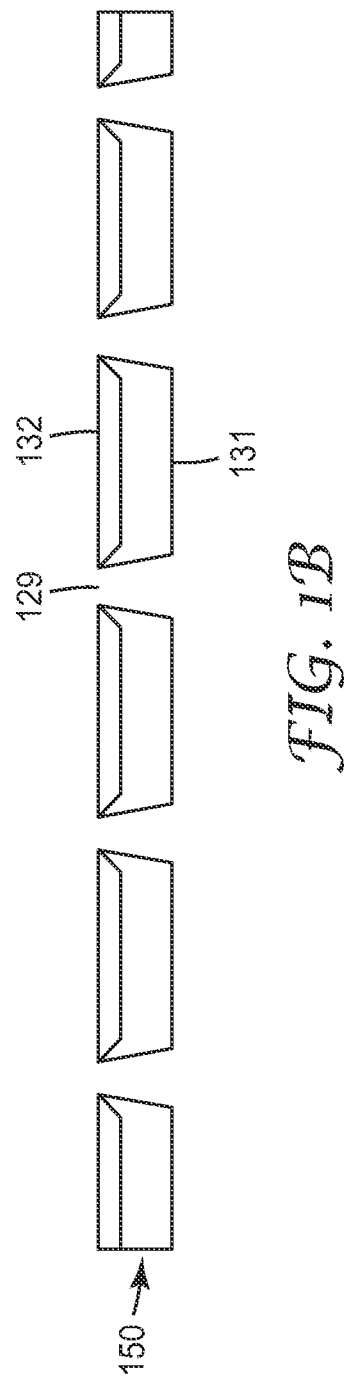

METHOD OF MAKING POLYMERIC MULTILAYER FILMS

CROSS REFERENCE TO RELATED APPLICATIONS

This application is a national stage filing under 35 U.S.C. 371 of PCT/US2014/067294, filed Nov. 25, 2014, which claims the benefit of U.S. Provisional Application No. 61/915,196, filed Dec. 12, 2013, the disclosure of which is incorporated by reference in its/their entirety herein.

BACKGROUND

Perforated films are typically used in the personal hygiene field providing a fluid transfer film allowing the fluid to be removed from areas near to the skin and into the absorbent area. Other common applications are in the food packaging industry and more recently acoustics absorption. Perforated films for these applications are usually less than 100 micrometers (0.004 inch) thick (more typically less than 50 micrometers (0.002 inch) thick) and are made, for example, of olefins, polypropylene, or polyethylene.

Typical processing methods to produce perforated films include; vacuum drawing of film into a perforated panel or roll, use of pressurized fluid to form and puncture the film, needle punching with either cold or hot needles, or lasers to melt holes in the film. These processes, however, tend to have processing limitations such a hole size, hole density, and/or film thickness of film.

Vacuum or pressurized fluid forming of perforated films tends to be limited to relatively thin films (i.e., films less than 100 micrometers thick) due to the forces available to deform and puncture the film. Also materials used in this type of forming process tend to be limited to olefin-based polymers. Another characteristic of this type of process is the creation of a protrusion in the film where the film is stretched until a perforation is created. This protrusion can be an advantage in the case of fluid control where the protrusion can act as a directional flow control feature. However, it can also be a disadvantage in applications where a low pressure drop is desired. The protrusion creates an elongated hole thereby increasing the surface area and increase fluid drag.

Needle punching processes are also largely used for relatively thin films, but film thicknesses up to about 254 micrometers (0.010 inch) are sometimes seen. Limitations with this process tend to include perforation diameter holes per unit area, and protrusions in the film.

Laser perforation processes can provide relatively small holes (i.e., less than 50 micrometers), can perforate a wide range of thicknesses, can create perforations that are planar with the film surfaces (i.e., without the protrusions associated, for example, with needle punching processes). Limitations of laser perforation processes include the types of materials that suitable for the process, and processing speeds and costs. Laser perforation processes tend to be best suited for processing films from polyethylene terephthalate (PET), polyethylenenaphthalate (PEN), polycarbonate (PC), or other higher glass transition temperature materials. Lasers are often not very effective, for example, in perforating olefin-based materials.

SUMMARY

In one aspect, the present disclosure describes a method of making a polymeric multilayer film, the method comprising:

extruding at least first and second polymeric layers into a nip to provide a polymeric multilayer film, wherein the nip comprises a first roll having a structured surface that imparts indentations through a first major surface of the polymeric multilayer film, wherein the first layer comprises a first polymer having a first melting point, wherein the second layer comprises a second polymer having a second melting point, wherein the absolute difference between the first and second melting point is at least 20° C. (in some embodiments, at least 30° C., 40° C., 50° C., 60° C., or even at least 70° C.), and wherein the first major surface of the polymeric multilayer film is a major surface of the first layer and the second major surface of the polymeric multilayer film is a major surface of the second layer; and passing the first major surface having the indentations over a chill roll while applying a heat source to a generally opposed second major surface of the polymeric multilayer film, wherein the application of heat from the heat source results in formation of openings to provide a polymeric multilayer film having first and second generally opposed major surfaces, an array of openings extending between the first and second major surfaces, and at least first and second layers, wherein the first layer comprises the first polymer, wherein the second layer comprises the second polymer, and wherein the first major surface of the polymeric multilayer film is a major surface of the first layer and the second major surface of the polymeric multilayer film is a major surface of the second layer.

Embodiments of polymeric multilayer film described herein are useful, for example, for filtration and acoustic absorption.

BRIEF DESCRIPTION OF THE DRAWINGS

FIGS. 1A and 1B are schematics of exemplary polymeric multilayer film made from exemplary method for making exemplary polymeric multilayer film shown in FIG. 1 described herein.

DETAILED DESCRIPTION

Figure 1:
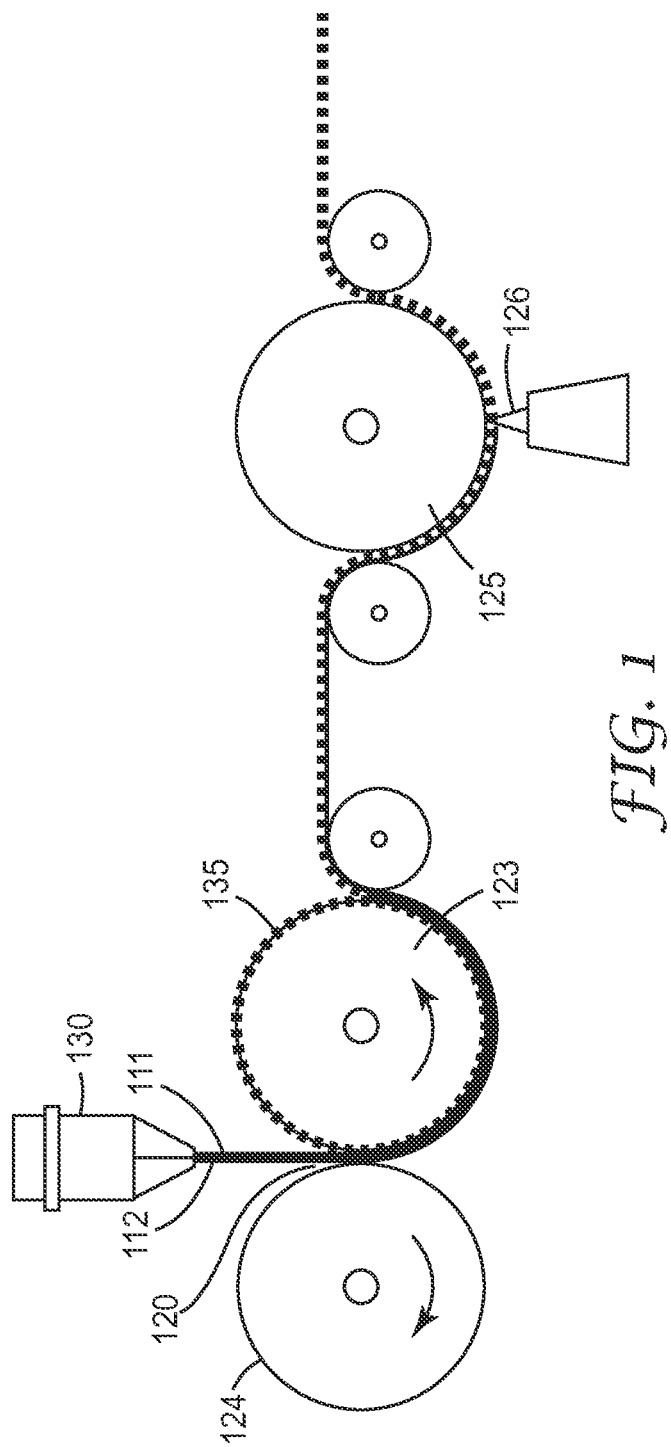
FIG. 1 is a schematic of an exemplary method for making exemplary polymeric multilayer film described herein.

Referring to FIG. 1, a schematic of an exemplary method is shown. FIGS. 1A and 1B are schematics of exemplary polymeric multilayer film made from exemplary method for making exemplary polymeric multilayer film shown in FIG. 1 described herein.

First and second polymeric layers 111 and 112 are extruded into nip 120 to provide polymeric multilayer film 115. Nip 120 has first roll 123 having structured surface 135 that imparts indentations through first major surface 121 of polymeric multilayer film 115. First layer 111A comprises a first polymer having a first melting point. Second layer 112A comprises a second polymer having a second melting point. The absolute difference between the first and second melting point is at least 20° C. (in some embodiments, at least 30° C., 40° C., 50° C., 60° C., or even at least 70° C.). First major surface 121 of polymeric multilayer film 115 is a major surface of first layer 111A. Second major surface 122 of polymeric multilayer film 115 is a major surface of second layer 112A. First major surface 121 having the indentations is passed over chill roll 125 while applying heat source 126 (e.g., a flame) to second major surface of the polymeric multilayer film 122. The application of heat from heat source 126 results in formation of openings 129 to provide polymeric multilayer film 150 having first and second generally opposed major surfaces 131, 132 and an array of openings 129 extending between first and second major surfaces 131, 132.

Suitable extrusion apparatuses (including materials for making components of the apparatuses) for making multilayer films described herein should be apparent to those skilled in the art after reviewing the instant disclosure, including the working examples. For examples, the rolls (e.g., 123, 124, 125) can be made of metals such as steel. In some embodiments the surface of rolls contacting the polymeric material(s) are chrome plated, copper plated, or aluminum. Rolls can be chilled, for example using conventional techniques such as water cooling. Nip force can be provided, for example, by pneumatic cylinders.

Exemplary extrusion speeds include those in a range from 3-15 m/min. (in some embodiments, in a range from 15-50 m/min, 50-100 m/min., or more).

Exemplary extrusion temperatures are in range from 200° C.-230° C. (in some embodiments, in a range from 230° C.-260° C., 260-300° C., or greater).

Exemplary polymeric materials for making the polymeric multilayer films include polypropylene and polyethylene. In some embodiments of polymeric multilayer films described herein at least one of the layers comprises polypropylene and at least another of the layers comprises polyethylene.

Exemplary polymeric materials for making the polymeric multilayer films include polyamide 6, polyamide 66, polyethyleneterephthalate (PET), copolyester (PETg), polymethylmethacrylate (PMMA), acrylonitrile butadiene styrene (ABS), polyolefin copolymers, polyethylene, and polystyrene (PS), ethylene vinyl alcohol (EVOH), polycarbonate (PC), polybutyleneterephthalate (PBT), polyethylenenaphthalate (PEN), polypropylene, polyethylene, ethylene-acrylic acid (EAA), ethylene butyl-acrylate (EBA), ethylene vinyl acetate (EVA), ethylene methyl-acrylate (EMA), propylene-based interpolymers and ethylene-based interpolymers.

Examples of suitable material combinations include: polyethyleneterephthalate (PET) and ethylene-acrylic acid (EAA); polyethyleneterephthalate (PET) and ethylene vinyl acetate (EVA); polyethyleneterephthalate (PET) and ethylene butyl-acrylate (EBA); polyethyleneterephthalate (PET) and ethylene methyl-acrylate (EMA); polyethyleneterephthalate (PET) and propylene-based interpolymers; polyethyleneterephthalate (PET) and ethylene-based interpolymers; copolyester (coPETg) and ethylene-acrylic acid (EAA); copolyeester (PETg) and ethylene vinyl acetate (EVA); copolyeester (PETg) and ethylene butyl-acrylate (EBA); copolyester (PETg) and ethylene methyl-acrylate (EMA); copolyester (PETg) and propylene-based interpolymers; copolyester (PETg) and ethylene-based interpolymers; ethylene vinyl alcohol (EVOH) and ethylene-acrylic acid (EAA); ethylene vinyl alcohol (EVOH) and ethylene vinyl acetate (EVA); ethylene vinyl alcohol (EVOH) and ethylene butyl-acrylate (EBA); ethylene vinyl alcohol (EVOH) and ethylene methyl-acrylate (EMA); ethylene vinyl alcohol (EVOH) and propylene-based interpolymers; ethylene vinyl alcohol (EVOH) and ethylene-based interpolymers; polyamide 6 and ethylene-acrylic acid (EAA); polyamide 6 and ethylene vinyl acetate (EVA); polyamide 6 and ethylene butyl-acrylate (EBA); polyamide 6 and ethylene methyl-acrylate (EMA); polyamide 6 and propylene-based interpolymers; polyamide 6 and ethylene-based interpolymers; polyamide 66 and ethylene-acrylic acid (EAA); polyamide 66 and ethylene vinyl acetate (EVA); polyamide 66 and ethylene butyl-acrylate (EBA); polyamide 66 and ethylene methyl-acrylate (EMA); polyamide 66 and propylene-based interpolymers; polyamide 66 and ethylene-based interpolymers; linear low density polyethylene (LLDPE) and ethylene-acrylic acid (EAA); linear low density polyethylene (LLDPE) and ethylene vinyl acetate (EVA); linear low density polyethylene (LLDPE) and ethylene butyl-acrylate (EBA); linear low density polyethylene (LLDPE) and ethylene methyl-acrylate (EMA); linear low density polyethylene (LLDPE) and propylene-based interpolymers; linear low density polyethylene (LLDPE) and ethylene-based interpolymers; low density polyethylene (LDPE) and ethylene-acrylic acid (EAA); low density polyethylene (LDPE) and ethylene vinyl acetate (EVA); low density polyethylene (LDPE) and ethylene butyl-acrylate (EBA); low density polyethylene (LDPE) and ethylene methyl-acrylate (EMA); low density polyethylene (LDPE) and propylene-based interpolymers; low density polyethylene (LDPE) and ethylene-based interpolymers; medium density polyethylene (MDPE) and ethylene-acrylic acid (EAA); medium density polyethylene (MDPE) and ethylene vinyl acetate (EVA); medium density polyethylene (MDPE) and ethylene butyl-acrylate (EBA); medium density polyethylene (MDPE) and ethylene methyl-acrylate (EMA); medium density polyethylene (MDPE) and propylene-based interpolymers; medium density polyethylene (MDPE) and ethylene-based interpolymers; high density polyethylene (HDPE) and ethylene-acrylic acid (EAA); high density polyethylene (HDPE) and ethylene vinyl acetate (EVA); high density polyethylene (HDPE) and ethylene butyl-acrylate (EBA); high density polyethylene (HDPE) and ethylene methyl-acrylate (EMA); high density polyethylene (HDPE) and propylene-based interpolymers; high density polyethylene (HDPE) and ethylene-based interpolymers; acrylonitrile butadiene styrene (ABS) and ethylene-acrylic acid (EAA); acrylonitrile butadiene styrene (ABS) and ethylene vinyl acetate (EVA); acrylonitrile butadiene styrene (ABS) and ethylene butyl-acrylate (EBA); acrylonitrile butadiene styrene (ABS) and ethylene methyl-acrylate (EMA); acrylonitrile butadiene styrene (ABS) and propylene-based interpolymers; acrylonitrile butadiene styrene (ABS) and ethylene-based interpolymers; polycarbonate (PC) and ethylene-acrylic acid (EAA); polycarbonate (PC) and ethylene vinyl acetate (EVA); polycarbonate (PC) and ethylene butyl-acrylate (EBA); polycarbonate (PC) and ethylene methyl-acrylate (EMA); polycarbonate (PC) and propylene-based interpolymers; polycarbonate (PC) and ethylene-based interpolymers; polybutyleneterephthalate (PBT) and ethylene-acrylic acid (EAA); polybutyleneterephthalate (PBT) and ethylene vinyl acetate (EVA); polybutyleneterephthalate (PBT) and ethylene butyl-acrylate (EBA); polybutyleneterephthalate (PBT) and ethylene methyl-acrylate (EMA); polybutyleneterephthalate (PBT) and propylene-based interpolymers; polybutyleneterephthalate (PBT) and ethylene-based interpolymers; polymethylmethacrylate (PMMA) and ethylene-acrylic acid (EAA); polymethylmethacrylate (PMMA) and ethylene vinyl acetate (EVA); polymethylmethacrylate (PMMA) and ethylene butyl-acrylate (EBA); polymethylmethacrylate (PMMA) and ethylene methyl-acrylate (EMA); polymethylmethacrylate (PMMA) and propylene-based interpolymers; polymethylmethacrylate (PMMA) and ethylene-based interpolymers; polypropylene and ethylene-acrylic acid (EAA); polypropylene and ethylene vinyl acetate (EVA); polypropylene and ethylene butyl-acrylate (EBA); polypropylene and ethylene methyl-acrylate (EMA); polypropylene and propylene-based interpolymers; and polypropylene and ethylene-based interpolymers.

Suitable polypropylene materials include homo polypropylene and modified polypropylene such as block copolymers, impact copolymer, and random copolymers.

In some embodiments, the first layer comprises at least one of polycarbonate, polyamide 6, polyamide 66, polyethyleneterephthalate (PET), copolyesters (PETg), polymethylmethacrylate (PMMA), acrylonitrile butadiene styrene (ABS), polybutyleneterephthalate (PBT), polypropylene or polyethylene and the second layer comprises at least one of ethylene-acrylic acid (EAA), ethylene vinyl acetate (EVA), ethylene butyl-acrylate (EBA), ethylene methyl-acrylate (EMA), propylene-based interpolymers, or ethylene-based interpolymers.

Exemplary ethylene interpolymers are available, for example, under the trade designation "EXACT" from ExxonMobil, Irving, Tex.; and "ENGAGE" from Dow Chemical Company, Midland, Mich. Exemplary propylene interpolymers are available, for example, under the trade designation "VISTAMAXX" from ExxonMobil and "VERSIFY" from Dow Chemical Company.

Optionally, any of the polymeric materials comprising an article described herein may comprise additives such as inorganic fillers, pigments, slip agents, and flame retardants.

In some embodiments, the absolute difference between the first and second melting point is at least 30° C., 40° C., 50° C., 60° C., or even at least 70° C.). In some embodiments, the first melting point is greater than the second melting point. In some embodiments, the second melting point is greater than the first melting point.

In some embodiments, the first polymer has a first vicat temperature, wherein the second polymer has a second vicat temperature, and wherein the first and second vicat temperatures are different. In some embodiments, the first and second glass vicat temperatures are at least 20° C. (in some embodiments, at least 30° C., 40° C., 50° C., or even at least 60° C.) different.

In some embodiments, the polymeric multilayer film has a thickness greater than 50 micrometers (in some embodiments, at least than 75 micrometers, 100 micrometers, 150 micrometers, 200 micrometers, 250 micrometers, 500 micrometers, 750 micrometers, 1000 micrometers, 1500 micrometers, 2000 micrometers, or 2500 micrometers; in some embodiments, in a range from 125 micrometers to 1500 micrometers, or even 125 micrometers to 2500 micrometers).

The openings may be in any of a variety of shapes, including circles and ovals. In some embodiments, the polymeric multilayer film has at least 30 openings/cm$^2$ (in some embodiments, at least 100 openings/cm$^2$, at least 200 openings/cm$^2$, at least 250 openings/cm$^2$, at least 300 openings/cm$^2$, at least 400 openings/cm$^2$, at least 500 openings/cm$^2$, at least 600 openings/cm$^2$, at least 700 openings/cm$^2$, at least 750 openings/cm$^2$, at least 800 openings/cm$^2$, at least 900 openings/cm$^2$, at least 1000 openings/cm$^2$, at least 2000 openings/cm$^2$, at least 3000 openings/cm$^2$ or even at least 4000 openings/cm$^2$; in some embodiments, in a range from 30 openings/cm$^2$ to 200 openings/cm$^2$, 200 openings/cm$^2$ to 500 openings/cm$^2$, or even 500 openings/cm$^2$ to 4000 openings/cm$^2$).

In some embodiments, the openings have diameters of greater than 25 micrometers (in some embodiments, greater than 50 micrometers, 75 micrometers, 100 micrometers, 150 micrometers, 200 micrometers, 250 micrometers, 500 micrometers, 750 micrometers, 1000 micrometers, 1500 micrometers, 2000 micrometers, or 2500 micrometers; in some embodiments, in a range from 25 micrometers to 1500 micrometers, or even 25 micrometers to 2500 micrometers).

Embodiments of polymeric multilayer film described herein are useful, for example, for filtration and acoustic absorption.

EXEMPLARY EMBODIMENTS

1. A method of making a polymeric multilayer film, the method comprising:
    extruding at least first and second polymeric layers into a nip to provide a polymeric multilayer film, wherein the nip comprises a first roll having a structured surface that imparts indentations through a first major surface of the polymeric multilayer film, wherein the first layer comprises a first polymer having a first melting point, wherein the second layer comprises a second polymer having a second melting point, wherein the absolute difference between the first and second melting point is at least 20° C. (in some embodiments, at least 30° C., 40° C., 50° C., 60° C., or even at least 70° C.), and wherein the first major surface of the polymeric multilayer film is a major surface of the first layer and the second major surface of the polymeric multilayer film is a major surface of the second layer; and
    passing the first major surface having the indentations over a chill roll while applying a heat source to a generally opposed second major surface of the polymeric multilayer film, wherein the application of heat from the heat source results in formation of openings to provide a polymeric multilayer film having first and second generally opposed major surfaces, an array of openings extending between the first and second major surfaces, and at least first and second layers, wherein the first layer comprises the first polymer, wherein the second layer comprises the second polymer, and wherein the first major surface of the polymeric multilayer film is a major surface of the first layer and the second major surface of the polymeric multilayer film is a major surface of the second layer.

2. The method of Exemplary Embodiment 1, wherein the first melting point is greater than the second melting point.

3. The method of Exemplary Embodiment 1, wherein the second melting point is greater than the first melting point.

4. The method of any preceding Exemplary Embodiment, wherein the first polymer has a first vicat temperature, wherein the second polymer has a second vicat temperature, and wherein the first and second vicat temperatures are different.

5. The method of Exemplary Embodiment 4, wherein the first and second glass vicat temperatures are at least 20° C. (in some embodiments, at least 30° C., 40° C., 50° C., or even at least 60° C.) different.

6. The method of any preceding Exemplary Embodiment, wherein the polymeric multilayer film has a thickness greater than 50 micrometers (in some embodiments, at least than 75 micrometers, 100 micrometers, 150 micrometers, 200 micrometers, 250 micrometers, 500 micrometers, 750 micrometers, 1000 micrometers, 1500 micrometers, 2000 micrometers, or 2500 micrometers; in some embodiments, in a range from 125 micrometers to 1500 micrometers, or even 125 micrometers to 2500 micrometers).

7. The method of any preceding Exemplary Embodiment, wherein the polymeric multilayer film has at least 30 openings/cm$^2$ (in some embodiments, at least 100 openings/cm$^2$, at least 200 openings/cm$^2$, at least 250 openings/cm$^2$, at least 300 openings/cm$^2$, at least 400 openings/cm$^2$, at least 500 openings/cm$^2$, at least 600 openings/cm$^2$, at least 700 openings/cm$^2$, at least 750 openings/cm$^2$, at least 800 openings/ cm², at least 900 openings/cm², at least 1000 openings/cm², at least 2000 openings/cm², at least 3000 openings/cm² or at even least 4000 openings/cm²; in some embodiments, in a range from 30 openings/cm² to 200 openings/cm², 200 openings/cm² to 500 openings/cm², or even 500 openings/cm² to 4000 openings/cm²).

8. The method of any preceding Exemplary Embodiment, wherein the openings have diameters of greater than 25 micrometers (in some embodiments, greater than 50 micrometers, 75 micrometers, 100 micrometers, 150 micrometers, 200 micrometers, 250 micrometers, 500 micrometers, 750 micrometers, 1000 micrometers, 1500 micrometers, 2000 micrometers, or 2500 micrometers; in some embodiments, in a range from 25 micrometers to 1500 micrometers, or even 25 micrometers to 2500 micrometers).

9. The method of any preceding Exemplary Embodiment, further comprising separating at least the first and second layers of the polymeric multilayer film having the openings.

10. The method of any preceding Exemplary Embodiment, wherein the first polymer at least one of polyethyleneterephthalate (PET), copolyester (coPETg), ethylene vinyl alcohol (EVOH), polyamide 6, polyamide 66, linear low density polyethylene (LLDPE), low density polyethylene (LDPE), medium density polyethylene (MDPE), high density polyethylene (HDPE), acrylonitrile butadiene styrene (ABS), polycarbonate (PC), polybutyleneterephthalate (PBT), polymethylmethacrylate (PMMA), or polypropylene; and wherein the second polymer at least one of ethylene-acrylic acid (EAA), ethylene butyl-acrylate (EBA), ethylene vinyl acetate (EVA), ethylene methyl-acrylate (EMA), propylene-based interpolymers, or ethylene-based interpolymers.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

Example 1

A perforated multilayer polymeric film was prepared using the following procedures. A two layer polymeric film consisting of layers A, and B was prepared using two extruders to feed a 25 cm wide 3 layer multi-manifold die (obtained under the trade designation "CLOEREN" from Cloeren, Inc., Orange Tex.). The center port was closed off on the die and not used. The extrusion process was done vertically downward into a nip consisting of a tooling roll (123) and a smooth steel backup roll (124). The extrusion process was configured such that layer A contacted the tooling roll (123) and layer B contacted the backup roll (124) as shown schematically in FIG. 1. The polymeric multilayer film made as generally shown in FIG. 1 is shown in FIGS. 1A and 1B. The polymer for layer A was provided with a 3.2 cm single screw extruder. The polymer for layer B was provided with a 5.1 cm single screw extruder. Heating zone temperatures for the three extruders is shown in Table 1, below.

TABLE 1

| Heating Zones | 3.2 cm (1.25 inch) Layer A, ° C. | 5.1 cm (2.0 inch) Layer B, ° C. | Die, ° C. |
|---|---|---|---|
| Zone 1 | 196 | 188 | 218 |
| Zone 2 | 210 | 199 | 218 |
| Zone 3 | 218 | 204 | 218 |

TABLE 1-continued

| Heating Zones | 3.2 cm (1.25 inch) Layer A, ° C. | 5.1 cm (2.0 inch) Layer B, ° C. | Die, ° C. |
|---|---|---|---|
| Zone 4 | 218 | 218 | N/A |
| End cap | 218 | 218 | N/A |
| Neck Tube | 218 | 218 | N/A |

The rpms of the extruders are listed in Table 2, below.

TABLE 2

| | 3.2 cm (1.25 inch) Layer A | 5.1 cm (2.0 inch) Layer B |
|---|---|---|
| Extruder rpm | 53 | 16 |

Layers A (111A) was extruded using a polypropylene impact copolymer resin (obtained under the trade designation "DOW C700-35N 35 MFI" from Dow Chemical Company, Midland, Mich.). Layers B (112A) was extruded using a ethylene-based interpolymers (obtained under the trade designation "DOW ENGAGE 8401" from Dow Chemical Company). The basis weight for the combined layers AB (111A, 112A) was 220 g/m².

The two rolls comprising the nip were water cooled rolls (123, 124) with a nominal 30.5 cm in diameter and 40.6 cm face widths. Nip force was provided by pneumatic cylinders. The smooth steel backup roll (124) temperature set point of 52° C. The tooling roll (123) had male post features (135) cut into the surface of the roll. The male post features were chrome plated. The male features (defined as posts) (135) on the tool surface were flat square topped pyramids with a square base. The top of the posts were 94 micrometers square and the bases were 500 micrometers square. The overall post height was 914 micrometers. The center to center spacing of the posts was 820 micrometers in both the radial and cross roll directions. The tooling roll (123) had a temperature set point of 65° C. The tooling roll (123) and backup rolls (124) were directly driven. The nip force between the two nip rolls was 490 Newton per linear centimeter. The extrudate takeaway line speed was 3.0 m/min.

The polymers for the two layers were extruded from the die (130) directly into the nip (120) between the tooling (123) and backup roll (124). The male features (135) on the tooling roll (123) created indentations (127) in the extrudate. A thin layer of polymer (128) remained between the tooling (123) and backup roll (124). Typically this layer (128) was less than 20 micrometer thick. The extrudate remained on the tooling roll (123) for 180 degrees of wrap to chill and solidify the extrudate into a multi-layer polymeric film. Layers AB (111A, 112A) were then wound into roll form.

The multi-layer polymeric film containing indentations was then converted into a perforated film using the following procedure. A flame perforation system as described in U.S. Pat. No. 7,037,100 (Strobel et. al.), the disclosure of which is incorporated herein by reference, and utilizing the burner design from U.S. Pat. No. 7,635,264 (Strobel et. al.), the disclosure of which is incorporated herein by reference was used to melt and remove the thin layer (128).

Specific modifications to the equipment and process conditions for this experiment were as follows:

The chill roll (125) was a smooth surface roll without an etched or engraved pattern.

The burner (126) was a 30.5 centimeter (12 inch) eight port burner, anti howling design as described in U.S. Pat. No. 7,635,264 (Strobel et. al.), the disclosure of which is incorporated by reference, and was obtained from Flynn Burner Corporation, New Rochelle, N.Y.

Unwind Tension: 22 Newton total tension

Winder Tension: 22 Newton total tension

Burner (126) BTU's 2165 BTU/cm/hour

1% excess oxygen

Gap between burner (126) and the film surface: 4.4 mm

Line Speed: 30.5 m/min.

Chill roll (125) cooling water set point: 15.5° C.

The multilayer polymeric film was processed through the apparatus schematically shown in FIG. 1 at the above conditions. The web orientation was such that the side of the film (120) with the thin polymer layer (128) was closest to the burner (126) and opposite of the chill roll (125). The chill roll (125) cooled the main body of the film, keeping the majority of the film below the softening point of the polymer. Heat from the burner flame (126) caused the remaining thin polymer layer (128) to melt thereby creating the perforations (129) in the film.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A method of making a polymeric multilayer film, the method comprising:

extruding at least first and second polymeric layers into a nip to provide a polymeric multilayer film, wherein the nip comprises a first roll having a structured surface that imparts indentations through a first major surface of the polymeric multilayer film, wherein the first layer comprises a first polymer having a first melting point, wherein the second layer comprises a second polymer having a second melting point, wherein the absolute difference between the first and second melting point is at least 20° C., and wherein the first major surface of the polymeric multilayer film is a major surface of the first layer and the second major surface of the polymeric multilayer film is a major surface of the second layer; and passing the first major surface having the indentations over a chill roll while applying a heat source to a generally opposed second major surface of the polymeric multilayer film, wherein the application of heat from the heat source results in formation of openings to provide a polymeric multilayer film having first and second generally opposed major surfaces, an array of openings extending between the first and second major surfaces, and at least first and second layers, wherein the first layer comprises the first polymer, wherein the second layer comprises the second polymer, and wherein the first major surface of the polymeric multilayer film is a major surface of the first layer and the second major surface of the polymeric multilayer film is a major surface of the second layer.

2. The method of claim 1, wherein the first melting point is greater than the second melting point.

3. The method of claim 1, wherein the second melting point is greater than the first melting point.

4. The method of claim 1, wherein the first polymer has a first vicat temperature, wherein the second polymer has a second vicat temperature, and wherein the first and second vicat temperatures are different.

5. The method of claim 4, wherein the first and second glass vicat temperatures are at least 20° C. different.

6. The method of claim 4, wherein the first and second glass vicat temperatures are at least 30° C. different.

7. The method of claim 1, wherein the first and second melt point temperatures have an absolute difference of at least 50° C.

8. The method of claim 1, wherein the polymeric multilayer film has a thickness greater than 50 micrometers.

9. The method of claim 1, wherein the polymeric multilayer film has at least 30 openings/cm$^2$.

10. The method of claim 1, wherein the openings have diameters of greater than 25 micrometers.

11. The method of 1, further comprising separating at least the first and second layers of the polymeric multilayer film having the openings.

12. The method of claim 1, wherein the first polymer is at least one of polyethyleneterephthalate, copolyester, ethylene vinyl alcohol, polyamide 6, polyamide 66, linear low density polyethylene, low density polyethylene, medium density polyethylene, high density polyethylene, acrylonitrile butadiene styrene, polycarbonate, polybutyleneterephthalate, polymethylmethacrylate or polypropylene; and wherein the second polymer at least one of ethylene-acrylic acid, ethylene butyl-acrylate, ethylene vinyl acetate, ethylene methylacrylate, propylene-based interpolymers, or ethylene-based interpolymers.

\* \* \* \* \*

UNITED STATES PATENT AND TRADEMARK OFFICE
CERTIFICATE OF CORRECTION

PATENT NO. : 9,962,851 B2
APPLICATION NO. : 15/038902
DATED : May 8, 2018
INVENTOR(S) : Slama et al.

Page 1 of 1

It is certified that error appears in the above-identified patent and that said Letters Patent is hereby corrected as shown below:

In the Specification

Column 3
Line 49, delete "copolyeester" and insert -- copolyester --, therefor.
Line 50, delete "copolyeester" and insert -- copolyester --, therefor.

In the Claims

Column 10
Line 35 (approx.), in Claim 11, after "of" insert -- claim --.

Signed and Sealed this
Tenth Day of July, 2018

Andrei Iancu
*Director of the United States Patent and Trademark Office*